(12) United States Patent
Lang et al.

(10) Patent No.: US 11,789,799 B2
(45) Date of Patent: Oct. 17, 2023

(54) PROTECTION AGAINST INTERNAL FAULTS IN BURNERS

(71) Applicant: Siemens Aktiengesellschaft, Munich (DE)

(72) Inventors: Erik Lang, Ettlingen (DE); Tharsice Ball, Schirrhein (FR)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 460 days.

(21) Appl. No.: 17/145,485

(22) Filed: Jan. 11, 2021

(65) Prior Publication Data

US 2021/0216393 A1 Jul. 15, 2021

(30) Foreign Application Priority Data

Jan. 10, 2020 (EP) ..................................... 20151210

(51) Int. Cl.
*G06F 11/00* (2006.01)
*G06F 11/07* (2006.01)
(Continued)

(52) U.S. Cl.
CPC ........ *G06F 11/0772* (2013.01); *G05B 19/058* (2013.01); *G05B 19/10* (2013.01);
(Continued)

(58) Field of Classification Search
CPC ............. G06F 11/0751; G06F 11/0772; G06F 11/1629; G06F 11/1633; G06F 1/28;
(Continued)

(56) References Cited

U.S. PATENT DOCUMENTS 7,656,629 B2 * 2/2010 Pullmann ............. H01H 47/002
361/62
7,721,149 B2 * 5/2010 Essame ............... G06F 11/1633
714/11
(Continued)

FOREIGN PATENT DOCUMENTS

DE 198 60 399 7/2000 ............... F23N 5/24
EP 0 614 049 9/1994 ............... F23N 5/24
(Continued)

OTHER PUBLICATIONS

Search Report for EP Application No. 20151210.0, 5 pages, dated Jun. 2, 2020.

*Primary Examiner* — Marc Duncan
(74) *Attorney, Agent, or Firm* — Slayden Grubert Beard PLLC

(57) ABSTRACT

Various embodiments include a switching arrangement comprising: two processors; an OR gate; a first position feedback device; and a first switch. The a first switch. The OR gate output is connected to the first switch. The first processor is connected to the first input of the OR gate and the second processor is in operative communication with the OR gate via the second input of the OR gate; At least one of the processors sends a digital ON signal to the OR gate and the OR gate actuates the first switch on receipt thereof. The first position feedback device connects to both processors. The processors are interconnected and each programmed to: read a first position signal from the first position feedback device; send the first position signal to the other processor; compare the read signal to the received signal; and generate an error message if they do not match.

15 Claims, 5 Drawing Sheets

(51) Int. Cl.
  *G05B 19/05* (2006.01)
  *G05B 19/10* (2006.01)
  *G05B 23/02* (2006.01)
  *G06F 1/28* (2006.01)
  *G06F 13/40* (2006.01)
  *F23N 5/24* (2006.01)

(52) U.S. Cl.
  CPC ..... *G05B 23/0205* (2013.01); *G05B 23/0259* (2013.01); *G06F 1/28* (2013.01); *G06F 11/0724* (2013.01); *G06F 11/0751* (2013.01); *G06F 13/4022* (2013.01); *F23N 5/242* (2013.01); *F23N 5/245* (2013.01)

(58) Field of Classification Search
  CPC ............ G05B 23/0259; G05B 23/0205; G05B 19/058; F23K 2900/05001; F23N 2231/10; F23N 2223/30; F23N 5/242
  See application file for complete search history.

(56) References Cited

U.S. PATENT DOCUMENTS

| | | | |
|---|---|---|---|
| 10,209,681 B2 | 2/2019 | Obrecht | .................... G05B 9/03 |
| 2004/0065533 A1* | 4/2004 | Schwesig | ........... G05B 19/0428 |
| | | | 200/410 |
| 2004/0264094 A1 | 12/2004 | Rahman et al. | .............. 361/115 |
| 2016/0282818 A1 | 9/2016 | Obrecht | .................... G05B 9/02 |

FOREIGN PATENT DOCUMENTS

| | | | | |
|---|---|---|---|---|
| EP | 2 295 863 | 3/2011 | ............... | F23N 5/24 |
| WO | 95 16944 | 6/1995 | ........... | G05B 19/042 |

* cited by examiner

PROTECTION AGAINST INTERNAL FAULTS IN BURNERS

CROSS-REFERENCE TO RELATED APPLICATIONS

This application claims priority to EP Application No. 20151210.0 filed Jan. 10, 2020, the contents of which are hereby incorporated by reference in their entirety.

TECHNICAL FIELD

The present disclosure relates to burners. Various embodiments include systems and/or methods for protecting against internal faults in an automatic burner control unit. Some embodiments may be used to protect against internal faults arising from faulty relays.

BACKGROUND

The safety of circuits for automatic burner control units is paramount. Safety-oriented controllers are also known from the fields of automation engineering, medical technology, and automotive engineering. Typically, measures for protecting against malfunctions are taken in systems for safety-critical tasks. These measures include, for example, using test signals to monitor function blocks of a safety apparatus. In some systems, a safety architecture to have a multi-channel design comprising result comparison. These measures are intended to detect randomly occurring (and optionally also systematically occurring) faults. A safe state of a (burner) system or of a process should be achieved by means of a monitoring unit.

Patent application EP2295863A2 relates to a combustion system and an automatic gas burner control unit and describes a device and a method for interrupting a supply of fuel. EP2295863A2 teaches a device 1 for an automatic gas burner control unit having three shutoff paths 2, 3 and 5. The first shutoff path 2 acts on a switch 11. The second shutoff path 3 acts on two parallel switches 16. The third shutoff path 5 acts on an additional switch 19. The switch 11, the parallel switches 16 and the additional switch 19 are connected in series. The first shutoff path 2 is based on a microcontroller 17. An additional microcontroller 6 is provided for the third shutoff path 5. The second shutoff path 3 comprises a logic chip 10. The first and second shutoff paths 2, 3 also have a power failure protection device 7.

U.S. Pat. No. 10,209,681B2 relates to a safety architecture for failsafe systems. The safety apparatus from U.S. Pat. No. 10,209,681B2 comprises a monitoring unit 30 and a test block 34. The test block 34 is connected to an output stage 38 and monitors output signals from the monitoring unit 30. The test block 34 generates enable signals from the output signals from the monitoring unit 30. In the output stage 38, a contact element 41 combines an output signal from the monitoring unit 30 with an enable signal from the test block 34. The output stage 38 provides a shutoff function depending on the result of the combining operation by the contact element 41. U.S. Pat. No. 10,209,681B2 also teaches a feedback signal 39 from the output stage 38 to the monitoring unit 30.

SUMMARY

The present disclosure teaches a circuit for an automatic burner control unit, which circuit is capable of detecting faulty microprocessors and/or faulty microcontrollers. The automatic burner control unit is also capable of detecting faulty control circuits for relays. The circuit according to the present disclosure also has advantages with regard to faulty relays. For example, some embodiments of the teachings herein include a switching arrangement, comprising: a first and a second processing unit ($1a$, $1b$) each comprising a first input; an OR gate (7), a first position feedback device ($6a$) and a first switch ($5a$), wherein the OR gate (7) has an output and is in operative communication with the first switch ($5a$) via the output of the OR gate (7); wherein the OR gate (7) has a first input and a second input, and the first processing unit ($1a$) is in operative communication with the OR gate (7) via the first input of the OR gate (7), and the second processing unit ($1b$) is in operative communication with the OR gate (7) via the second input of the OR gate (7); wherein at least one of the processing units ($1a$, $1b$) is configured to send a digital ON signal to the OR gate (7), and the OR gate (7) is configured to actuate the first switch ($5a$) on receiving the digital ON signal; wherein the first position feedback device ($6a$) is associated with the first switch ($5a$) and is in operative communication with the first input of the first processing unit ($1a$) and with the first input of the second processing unit ($1b$); wherein the processing units ($1a$, $1b$) are communicatively interconnected, and each of the processing units ($1a$, $1b$) is configured to: read a first position signal from the first position feedback device ($6a$); send the read first position signal to the other processing unit ($1b$, $1a$) so that the other processing unit ($1b$, $1a$) receives the sent first position signal; compare the read first position signal with the received first position signal; and output an error message if the read first position signal is different from is different from the received first position signal.

In some embodiments, each of the processing units ($1a$, $1b$) is configured to send a digital ON signal to the OR gate (7), wherein the OR gate (7) is configured to actuate the first switch ($5a$) on receiving at least one digital ON signal; wherein each of the processing units ($1a$, $1b$) is configured to: read a first position signal from the first position feedback device ($6a$) after sending the digital ON signal; send the read first position signal to the other processing unit ($1b$, $1a$) so that the other processing unit ($1b$, $1a$) receives the sent first position signal; compare the read first position signal with the received first position signal; and output an error message if the read first position signal is different from the received first position signal.

In some embodiments, the processing units ($1a$, $1b$) are communicatively interconnected, and the first processing unit ($1a$) is configured to: send a digital ON signal to the OR gate (7); and in consequence of sending the digital ON signal to the OR gate (7), to send a notification signal to the second processing unit ($1b$); wherein each of the processing units ($1a$, $1b$) is configured to: read a first position signal from the first position feedback device ($6a$) after sending the digital ON signal; send the read first position signal to the other processing unit ($1b$, $1a$) so that the other processing unit ($1b$, $1a$) receives the sent first position signal; compare the read first position signal with the received first position signal; and output an error message if the read first position signal is different from the received first position signal.

In some embodiments, the switching arrangement additionally comprises a current and/or voltage supply (3); wherein the first processing unit ($1a$) comprises an error register and a supply input; wherein the current and/or voltage supply (3) is galvanically connected to the supply input of the first processing unit ($1a$), wherein the first processing unit ($1a$) comprises a unit for monitoring over time a supply signal at the supply input of the first processing unit (1a); and wherein the unit for monitoring over time the supply signal is configured to set a value in the error register if the supply signal falls below a specified value.

In some embodiments, the first processing unit (1a) additionally comprises a second input, and the second processing unit (1b) additionally comprises a second input; wherein the switching arrangement additionally comprises a first AND gate (8a), a second position feedback device (6b) and a second switch (5b), wherein the first AND gate (8a) has an output and is in operative communication with the second switch (5b) via the output of the first AND gate (8a);
wherein the first AND gate (8a) has a first input and a second input, and the first processing unit (1a) is in operative communication with the first AND gate (8a) via the first input of the first AND gate (8a), and the second processing unit (1b) is in operative communication with the first AND gate (8a) via the second input of the first AND gate (8a); wherein each of the processing units (1a, 1b) is configured to send a digital ON signal to the first AND gate (8a), and the first AND gate (8a) is configured to actuate the second switch (5b) solely on receiving both digital ON signals; wherein the second position feedback device (6b) is associated with the second switch (5b) and is in operative communication with the second input of the first processing unit (1a) and with the second input of the second processing unit (1b); wherein the processing units (1a, 1b) are communicatively interconnected, and each of the processing units (1a, 1b) is configured to: read a second position signal from the second position feedback device (6b); send the read second position signal to the other processing unit (1b, 1a) so that the other processing unit (1b, 1a) receives the sent second position signal; compare the read second position signal with the received second position signal; and output an error message if the read second position signal is different from the received second position signal.

In some embodiments, there is an adjustable current and/or voltage supply (9); wherein the adjustable current and/or voltage supply (9) comprises an output and an enable input, and the first processing unit (1a) comprises an enable output; wherein the first processing unit (1a) is in operative communication with the adjustable current and/or voltage supply (9) via the enable output of the first processing unit (1a) and via the enable input of the adjustable current and/or voltage supply (9); wherein the first processing unit (1a) is configured to send an enable signal to the adjustable current and/or voltage supply (9); and wherein the adjustable current and/or voltage supply (9) is configured to provide a digital ON signal at its output in response to receiving the enable signal.

In some embodiments, the first AND gate (8a) comprises a third input, wherein the output of the adjustable current and/or voltage supply (9) is galvanically connected to the third input of the first AND gate (8a); wherein the first AND gate (8a) is configured to actuate the second switch (5b) if, and only if, a digital ON signal is present at the first input of the first AND gate (8a), and a digital ON signal is present at the second input of the first AND gate (8a), and a digital ON signal is present at the third input of the first AND gate (8a).

In some embodiments, the first processing unit (1a) additionally comprises a third input, and the second processing unit (1b) additionally comprises a third input; wherein the switching arrangement additionally comprises a second AND gate (8b), a third position feedback device (6c) and a third switch (5c), wherein the second AND gate (8b) has an output and is in operative communication with the third switch (5c) via the output of the second AND gate (8b), wherein the second AND gate (8b) has a first input and a second input, and the first processing unit (1a) is in operative communication with the second AND gate (8b) via the first input of the second AND gate (8b), and the second processing unit (1b) is in operative communication with the second AND gate (8b) via the second input of the second AND gate (8b), wherein each of the processing units (1a, 1b) is configured to send a digital ON signal to the second AND gate (8b), and the second AND gate (8b) is configured to actuate the third switch (5c) solely on receiving both digital ON signals, wherein the third position feedback device (6c) is associated with the third switch (5c) and is in operative communication with the third input of the first processing unit (1a) and with the third input of the second processing unit (1b), wherein the processing units (1a, 1b) are communicatively interconnected, and each of the processing units (1a, 1b) is configured to: read a third position signal from the third position feedback device (6c); send the read third position signal to the other processing unit (1b, 1a) so that the other processing unit (1b, 1a) receives the sent third position signal; compare the read third position signal with the received third position signal; and output an error message if the read third position signal is different from the received third position signal.

In some embodiments, the second AND gate (8b) comprises a third input; wherein the output of the adjustable current and/or voltage supply (9) is galvanically connected to the third input of the second AND gate (8b); wherein the second AND gate (8b) is configured to actuate the third switch (5c) if, and only if, a digital ON signal is present at the first input of the second AND gate (8b), and a digital ON signal is present at the second input of the second AND gate (8b), and a digital ON signal is present at the third input of the second AND gate (8b).

In some embodiments, the switching arrangement additionally comprises a fourth position feedback device (6d) and a fourth switch (5d); wherein the fourth switch (5d) is mechanically coupled to the first switch (5a) so that the fourth switch (5d) is in an open position if, and only if, the first switch (5a) is in an open position, and the fourth switch (5d) is in a closed position if, and only if, the first switch (5a) is in a closed position; wherein the fourth position feedback device (6d) is associated with the fourth switch (5d) and is in operative communication with the third input of the first processing unit (1a) and with the third input of the second processing unit (1b); wherein the processing units (1a, 1b) are communicatively interconnected, and each of the processing units (1a, 1b) is configured to: read a fourth position signal from the fourth position feedback device (6d); send the read fourth position signal to the other processing unit (1b, 1a) so that the other processing unit (1b, 1a) receives the sent fourth position signal; compare the read fourth position signal with the received fourth position signal; and output an error message if the read fourth position signal is different from the received fourth position signal.

In some embodiments, each of the processing units (1a, 1b) is configured to: compare the read first position signal with the received fourth position signal; and output an error message if the read first position signal is different from the received fourth position signal.

In some embodiments, each of the processing units (1a, 1b) is configured to: compare the read fourth position signal with the received first position signal; and output an error message if the read fourth position signal is different from the received first position signal.

In some embodiments, the switching arrangement additionally comprises a valve (4); wherein the first switch (5a), the valve (4) and the fourth switch (5d) are connected in series; and wherein the valve (4) is arranged between the first switch (5a) and the fourth switch (5d).

In some embodiments, the switching arrangement comprises at least one feedback resistor (12); wherein the fourth position feedback device (6d) is galvanically connected to the at least one feedback resistor (12).

In some embodiments, the switching arrangement comprises at least one parallel resistor (13) and at least one diode (19); wherein the at least one parallel resistor (13) is connected in parallel with the fourth switch (5d, 5e); wherein the at least one parallel resistor (13) comprises a first contact, and the fourth switch (5d, 5e) comprises a first contact; wherein the first contact of the at least one parallel resistor (13) is galvanically connected to the first contact of the fourth switch (5d, 5e); and wherein the first contact is connected via the at least one diode (19) to the third input of the first processing unit (1a).

BRIEF DESCRIPTION OF THE DRAWINGS

A person skilled in the art can obtain various details from the following detailed description. The individual embodiments have no limiting effect. The description is accompanied by drawings, in which.

DETAILED DESCRIPTION

Some embodiments of the teachings of the present disclosure include a switching arrangement comprising a switch, in particular comprising a relay. The switch is connected in series with a load such as a valve, for instance. It is the task of the switching arrangement to deal with a failure of the switch, for instance caused by relay contacts welding together, while avoiding failure of the entire automatic burner control unit. For this purpose, fundamental functions of the switch and/or of the processing units involved are tested prior to putting into operation.

In some embodiments, a switch designed as a break contact is opened. Then two processing units read a signal via a position feedback device. An error message is output if the two processing units read different signals from the position feedback device. The processing units are communicatively coupled together in order to allow a comparison of the results between the processing units.

Some embodiments of the present disclosure may be used to test additional relays. In this process, a relay designed as a make contact may be closed only when two processing units output an appropriate signal as independently as possible from each other.

Some embodiments of the present disclosure may be used to provide power failure protection. The power failure protection of an adjustable supply may be provided such that in the event of power failure protection not working, the aforementioned make contact cannot be actuated.

Some embodiments of the present disclosure may be used to make optimum use of power failure protection mechanisms contained in the processing units. In particular these are mechanisms that can be enabled and disabled by programming.

Some embodiments of the present disclosure may be used to use existing inputs of processing units as efficiently as possible. For this purpose, signals from a plurality of position feedback devices are, as far as possible, taken to one and the same input.

Some embodiments of the present disclosure may be used to derive from as many independent signals as possible, protection against internal faults. In particular, the protection against internal faults is based on a plurality of independent signals from position feedback devices.

Some embodiments of the present disclosure may be used to provide shutoff functions that are as reliable as possible. This is done by coupling, in particular mechanically coupling, a plurality of switches. As a result, in the event of one switch failing, another coupled switch assumes the shutoff function.

Some embodiments of the present disclosure may be used to integrate a circuit for detecting faulty relays into the switching arrangement.

Figure 1:
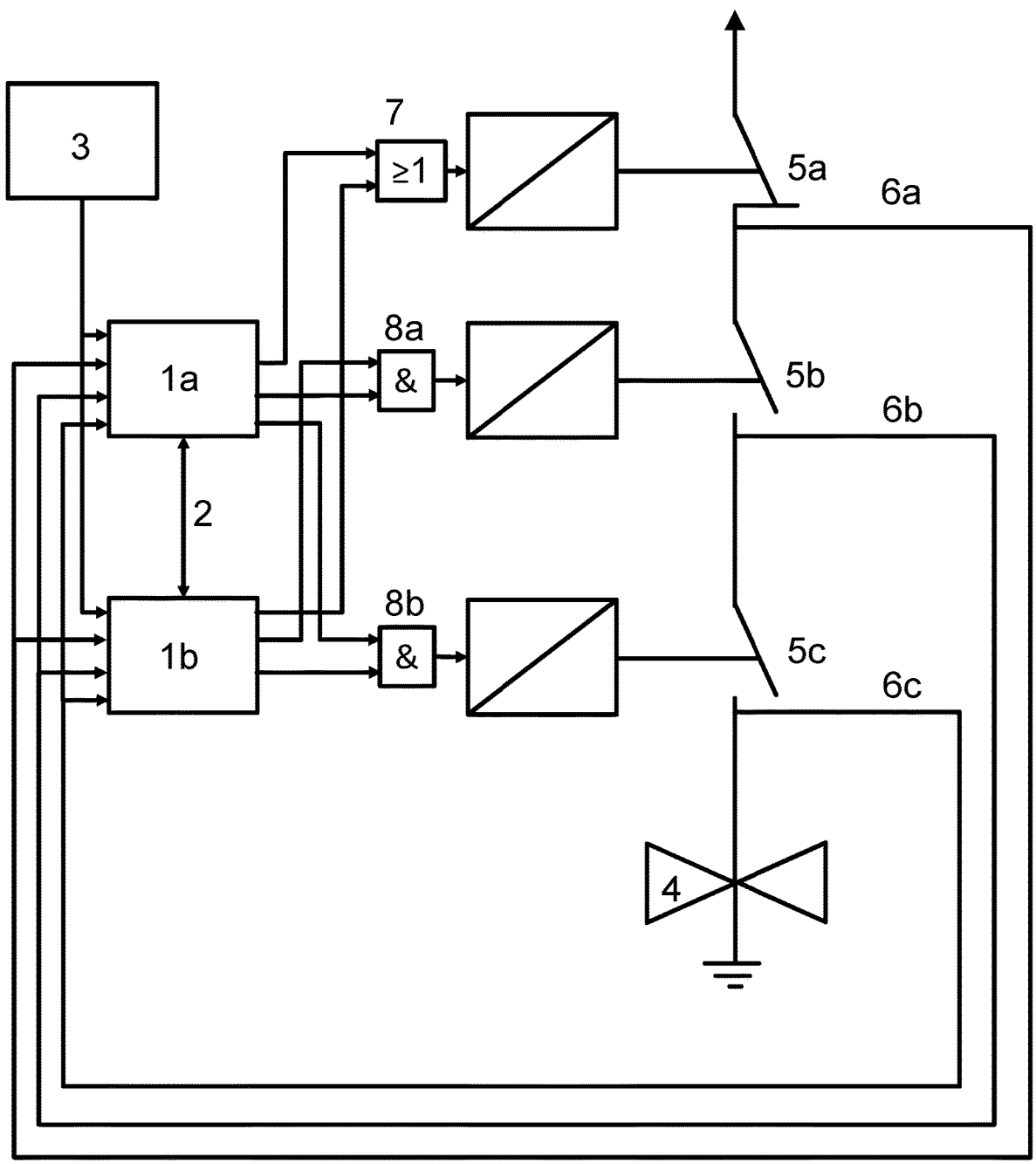
FIG. 1 shows a circuit for an automatic burner control unit.

FIG. 1 shows a circuit for an automatic burner control unit. The circuit in FIG. 1 comprises at least two processing units 1a, 1b. In some embodiments, the processing unit 1a comprises a microcontroller and/or a microprocessor. In some embodiments, the processing unit 1b likewise comprises a microcontroller and/or a microprocessor. In some embodiments, both processing units 1a, 1b each comprise a microcontroller. In some embodiments, both processing units 1a, 1b each comprise a microprocessor.

In some embodiments, the processing unit 1a comprises what is known as brownout detection. The brownout detection can be activated, e.g., by programming. The brownout detection is configured to monitor the voltage supply to the processing unit 1a during operation of the processing unit 1a. In the event that the voltage supply is too low, the brownout detection is configured to set a corresponding register value of the processing unit 1a. The brownout detection of the processing unit 1a, and a microcontroller and/or a microprocessor of the processing unit 1a are preferably arranged on the same system-on-a-chip.

In some embodiments, the processing unit 1b comprises brownout detection. The brownout detection can be activated, e.g., by programming. The brownout detection is activated in the event of too low a supply voltage. The brownout detection is configured to monitor the voltage supply to the processing unit 1b during operation of the processing unit 1b. In the event that the voltage supply is too low, the brownout detection is configured to set a corresponding register value of the processing unit 1b. The brownout detection of the processing unit 1b, and a microcontroller and/or a microprocessor of the processing unit 1b are preferably arranged on the same system-on-a-chip. In some embodiments, both processing units 1a, 1b each comprise brownout detection.

In some embodiments, a communications bus 2, for instance a bidirectional communications bus, couples the processing units 1a, 1b. A bidirectional communications bus 2 allows communication both from the processing unit 1a towards the processing unit 1b, and conversely. The communications bus 2 is preferably a digital communications bus. The processing units 1a, 1b advantageously use a specified communications bus protocol, for instance a digital communications bus protocol. In some embodiments, the communications bus 2 comprises a wired connection between the processing units 1a, 1b.

A current and/or voltage supply 3 for the circuit supplies the processing units 1a, 1b with electrical power. The circuit current and/or voltage supply 3 preferably provides a voltage of 1.2 Volts and/or 2 Volts and/or 3 Volts and/or 3.3 Volts and/or 5 Volts and/or 6 Volts for the purpose of supplying the processing units 1a, 1b. Both processing units 1a, 1b may be supplied with the same voltage, in particular with the same DC voltage.

In some embodiments, the circuit current and/or voltage supply 3 comprises separate outputs for each of the processing units 1a, 1b. A first output is galvanically connected to the processing unit 1a. The first output can comprise in particular a short-circuit protection device. In other words, if a short-circuit occurs in the processing unit 1a or in a galvanic connection to the processing unit 1a, other outputs remain largely stable. A second output is galvanically connected to the processing unit 1b. The second output can comprise in particular a short-circuit protection device. In other words, if a short-circuit occurs in the processing unit 1b or in a galvanic connection to the processing unit 1b, other outputs remain largely stable.

The circuit in FIG. 1 performs open-loop and/or closed-loop control of a valve 4, for instance a safety valve. The valve 4 may be, in particular, a valve 4 of a gas burner and/or of an oil burner. A plurality of switches 5a-5c are connected in series with the valve 4 for the purpose of open-loop and/or closed-loop control of the valve 4. The switches 5a-5c may comprise relays. In particular, all the switches 5a-5c of the circuit in FIG. 1 can comprise relays. In another embodiment, at least one switch 5a-5c comprises a transistor and/or a field effect transistor and/or an insulated-gate bipolar transistor. In particular, each of the switches 5a-5c can comprise a transistor and/or a field effect transistor and/or a bipolar transistor. It is also provided that at least one switch 5a-5c comprises a tube amplifier and/or a vacuum switch. Tube amplifiers may be used for example in those circuits in which robustness is a priority.

An OR gate 7 is connected in front of the switch 5a. The OR gate 7 is connected to an output of each of the processing units 1a, 1b. The OR gate 7 can be connected in particular galvanically to an output of each of the processing units 1a, 1b.

In some embodiments, the switch 5a comprises a break contact. In other words, the switch 5a interrupts the supply of electric current to the valve 4 as soon as it is actuated. The OR gate 7 and the switch 5a thus interrupt the supply to the valve 4 as soon as at least one of the processing units 1a, 1b sends an appropriate signal to the OR gate 7.

An AND gate 8a is connected in front of the switch 5b. The AND gate 8a is connected to an output of each of the processing units 1a, 1b. The AND gate 8a can be connected in particular galvanically to an output of each of the processing units 1a, 1b.

In some embodiments, the switch 5b comprises a make contact. In other words, the switch 5b allows a flow of electric current as soon as it is actuated. The AND gate 8a and the switch 5b thus set one of the switches to conduct in the direction of the valve 4 if both processing units 1a, 1b send an appropriate signal to the AND gate 8a. Otherwise the switch 5b does not conduct an electric current.

An AND gate 8b is likewise connected in front of the switch 5c. The AND gate 8b is connected to an output of each of the processing units 1a, 1b. The AND gate 8b can be connected in particular galvanically to an output of each of the processing units 1a, 1b.

In some embodiments, the switch 5c comprises a make contact. In other words, the switch 5c allows a flow of electric current as soon as it is actuated. The AND gate 8b and the switch 5c thus set one of the switches to conduct in the direction of the valve 4 if both processing units 1a, 1b send an appropriate signal to the AND gate 8b. Otherwise the switch 5c does not conduct an electric current.

The switch 5a is coupled to a position feedback device 6a. In some embodiments, the position feedback device 6a is part of the switch 5a. The position feedback device 6a is connected to an input of the processing unit 1a. In some embodiments, the processing unit 1a comprises a digital input that is connected to the position feedback device 6a. In some embodiments, the processing unit 1a comprises an analog input, which is connected to the position feedback device 6a. In some embodiments, the processing unit 1a comprises a delta-sigma circuit for processing one or more signals from the position feedback device 6a. The position feedback device 6a is also connected to an input of the processing unit 1b. In some embodiments, the processing unit 1b comprises a digital input that is connected to the position feedback device 6a. In another embodiment, the processing unit 1b comprises an analog input, which is connected to the position feedback device 6a. In some embodiments, the processing unit 1b comprises a delta-sigma circuit for processing one or more signals from the position feedback device 6a.

The switch 5b is coupled to a position feedback device 6b. In some embodiments, the position feedback device 6b is part of the switch 5b. The position feedback device 6b is connected to an input of the processing unit 1a. The processing unit 1a preferably comprises a digital input that is connected to the position feedback device 6b. In another embodiment, the processing unit 1a comprises an analog input, which is connected to the position feedback device 6b. In some embodiments, the processing unit 1a comprises a delta-sigma circuit for processing one or more signals from the position feedback device 6b. The position feedback device 6b is also connected to an input of the processing unit 1b. In some embodiments, the processing unit 1b comprises a digital input that is connected to the position feedback device 6b. In some embodiments, the processing unit 1b comprises an analog input, which is connected to the position feedback device 6b. In some embodiments, the processing unit 1b comprises a delta-sigma circuit for processing one or more signals from the position feedback device 6b.

In addition, the switch 5c is coupled to a position feedback device 6c. In some embodiments, the position feedback device 6c is part of the switch 5c. The position feedback device 6c is connected to an input of the processing unit 1a. In some embodiments, the processing unit 1a comprises a digital input that is connected to the position feedback device 6c. In some embodiments, the processing unit 1a comprises an analog input, which is connected to the position feedback device 6c. In some embodiments, the processing unit 1a comprises a delta-sigma circuit for processing one or more signals from the position feedback device 6c. The position feedback device 6c is also connected to an input of the processing unit 1b. In some embodiments, the processing unit 1b comprises a digital input that is connected to the position feedback device 6c. In some embodiments, the processing unit 1b comprises an analog input, which is connected to the position feedback device 6c. In some embodiments, the processing unit 1b comprises a delta-sigma circuit for processing one or more signals from the position feedback device 6c.

Figure 2:
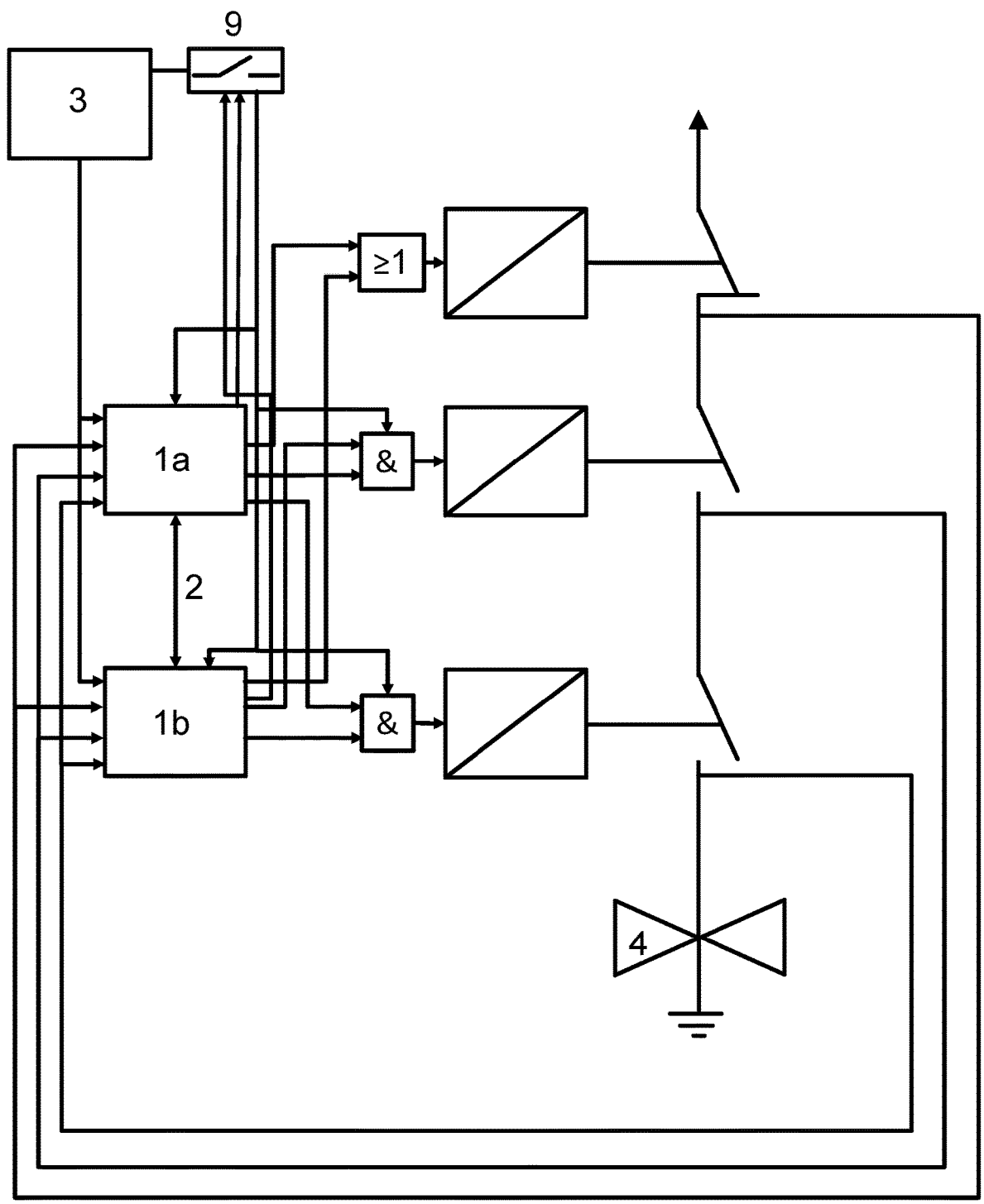
FIG. 2 shows, like FIG. 1, a circuit for an automatic burner control unit, which circuit incorporates an adjustable current and/or voltage supply.

The circuit in FIG. 2 comprises an adjustable current and/or voltage supply 9. The adjustable current and/or voltage supply 9 has an input. Said input is connected to one of the processing units 1a. In some embodiments, the input of the adjustable current and/or voltage supply 9 can be galvanically connected to one of the processing units 1a.

The adjustable current and/or voltage supply 9 receives from the processing unit 1a a signal, for instance an oscillating signal. It is provided that the signal oscillates at at least 20 Hertz and/or 1 kilohertz and/or at at least 5 kilohertz and/or at at least 20 kilohertz. In some embodiments, the current and/or voltage supply 9 provides a current and/or voltage signal if, and only if, a signal is received from the processing unit 1a. In some embodiments, said current and/or voltage signal is a function of the frequency of the signal from the processing unit 1a. In some embodiments, the current and/or voltage signal may be proportional to the frequency of the signal from the processing unit 1a.

The adjustable current and/or voltage supply 9 is connected to an input of the AND gate 8a. The AND gate 8a hence switches one of the switches 5b to conduct in the direction of the valve 4 if the adjustable current and/or voltage supply 9 sends an appropriate signal. Without an appropriate signal from the current and/or voltage supply 9, the switch 5b does not conduct an electric current. The switch 5b does not conduct an electric current without an appropriate signal from either of the two processing units 1a, 1b.

The adjustable current and/or voltage supply 9 is also connected to an input of the AND gate 8b. The AND gate 8b hence switches one of the switches 5c to conduct in the direction of the valve 4 if the adjustable current and/or voltage supply 9 sends an appropriate signal. Without an appropriate signal from the current and/or voltage supply 9, the switch 5c does not conduct an electric current. Equally, the switch 5c does not conduct an electric current without an appropriate signal from either of the two processing units 1a, 1b.

In some embodiments, the adjustable current and/or voltage supply 9 comprises separate outputs for each of the AND gates 8a, 8b. A first output is galvanically connected to the AND gate 8a. The first output can comprise a short-circuit protection device. This means that in the event of a short-circuit in the AND gate 8a or in a galvanic connection to the AND gate 8a, other outputs of the adjustable current and/or voltage supply 9 remain largely stable. A second output is galvanically connected to the AND gate 8b. The second output can comprise a short-circuit protection device. This means that in the event of a short-circuit in the AND gate 8b or in a galvanic connection to the AND gate 8b, other outputs of the adjustable current and/or voltage supply 9 remain largely stable.

Figure 3:
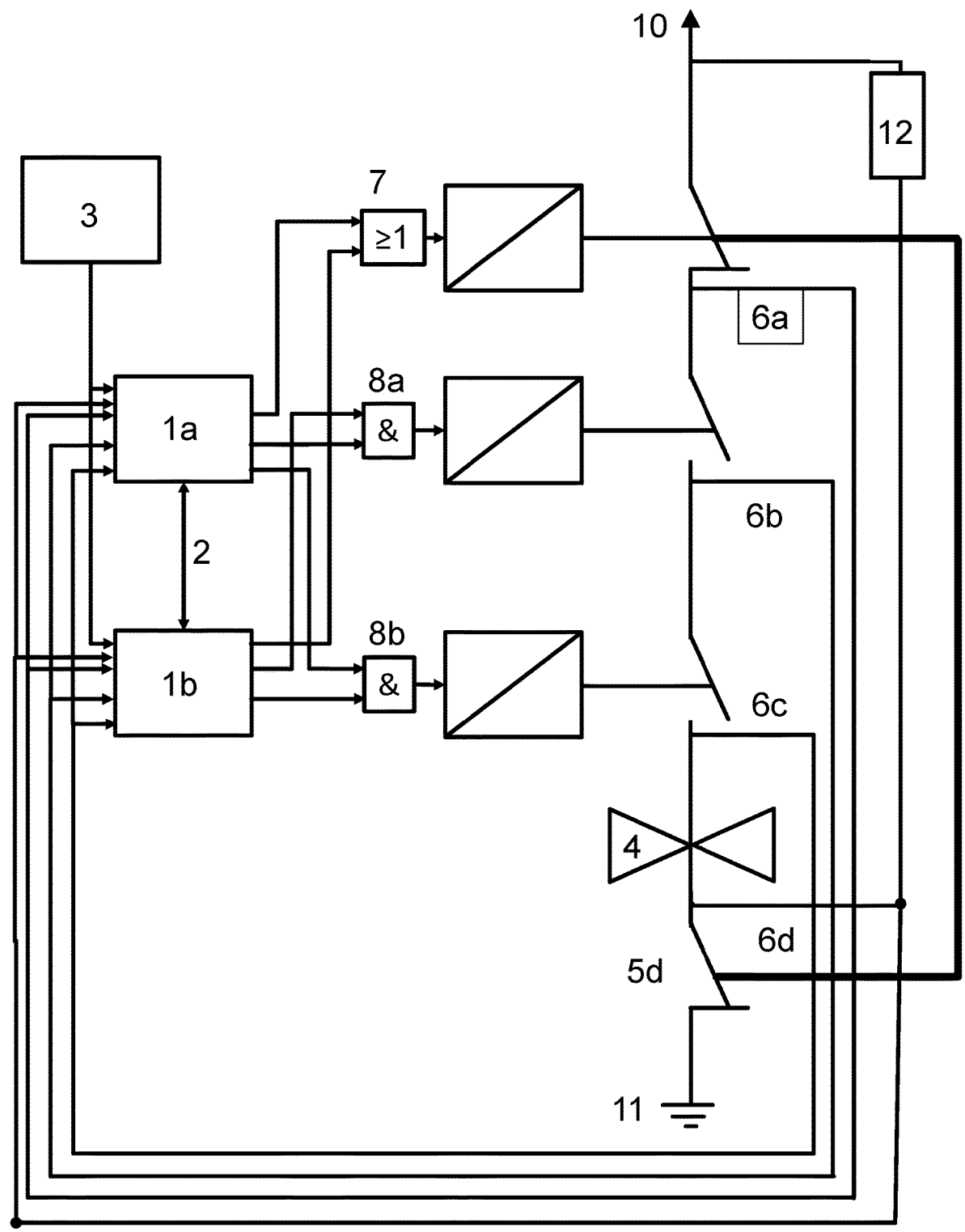
FIG. 3 shows a circuit for an automatic burner control unit having mechanically coupled relays.

The circuit shown in FIG. 3 comprises an additional switch 5d. In some embodiments, the additional switch 5d comprises a relay. In some embodiments, the switch 5d comprises a transistor and/or a field effect transistor and/or an insulated-gate bipolar transistor. In some embodiments, the additional switch 5d comprises a tube amplifier and/or a vacuum switch. Tube amplifiers may be used for example in those circuits in which robustness is a priority.

In some embodiments, the additional switch 5d comprises a break contact just like the switch 5a in FIG. 1. The additional switch 5d is mechanically coupled to the switch 5a shown in FIG. 1. In other words, the switches 5a and 5d switch synchronously.

In terms of circuitry, the switches 5a-5c are arranged on a first side of the valve 4. In some embodiments, the switches 5a-5c are arranged between valve 4 and valve current and/or voltage supply 10. In particular, the break contact 5a is arranged between valve and valve current and/or voltage supply 10. In terms of circuitry, the switch 5d is arranged on a second side of the valve 4. The side of the valve 4 that is second in terms of circuitry is different from the side of the valve 4 that is first in terms of circuitry. In some embodiments, the break contact 5d is arranged between valve 4 and ground and/or ground terminal 11.

The switch 5d is coupled to a position feedback device 6d. The position feedback device 6d is ideally part of the switch 5d. The position feedback device 6d is connected to an input of the processing unit 1a. In some embodiments, the processing unit 1a comprises a digital input that is connected to the position feedback device 6d. In some embodiments, the processing unit 1a comprises an analog input, which is connected to the position feedback device 6d. In some embodiments, the processing unit 1a comprises a delta-sigma circuit for processing one or more signals from the position feedback device 6d. The position feedback device 6d is also connected to an input of the processing unit 1b. In some embodiments, the processing unit 1b comprises a digital input that is connected to the position feedback device 6d. In some embodiments, the processing unit 1b comprises an analog input, which is connected to the position feedback device 6d. In some embodiments, the processing unit 1b comprises a delta-sigma circuit for processing one or more signals from the position feedback device 6d.

In some embodiments, the position feedback devices 6c and 6d are connected to the same input of the processing unit 1a. In some embodiments, the position feedback devices 6c and 6d can be galvanically connected to the same input of the processing unit 1a. In some embodiments, the position feedback devices 6c and 6d are also connected to the same input of the processing unit 1b. In particular, the position feedback devices 6c and 6d can be galvanically connected to the same input of the processing unit 1b.

In some embodiments, the position feedback devices 6c and 6d are also connected via a resistor or a plurality of resistors 12 to the valve current and/or voltage supply 10. In some embodiments, the valve current and/or voltage supply 10 is galvanically coupled to the circuit current and/or voltage supply 3. In some embodiments, the valve current and/or voltage supply 10 lies at line voltage. In this case, the line voltage is any internationally established voltage and frequency. In some embodiments, the line voltage refers to 50 Hertz AC at 220 Volts to 240 Volts or refers to 60 Hertz AC at approximately 110 Volts.

In addition, testing the integrity of a relay is provided. In a relay, contacts may weld together, for example, in consequence of switching operations. Consequently, it may no longer be possible to open a relay embodied as a break contact. The relay then fails.

Figure 4:
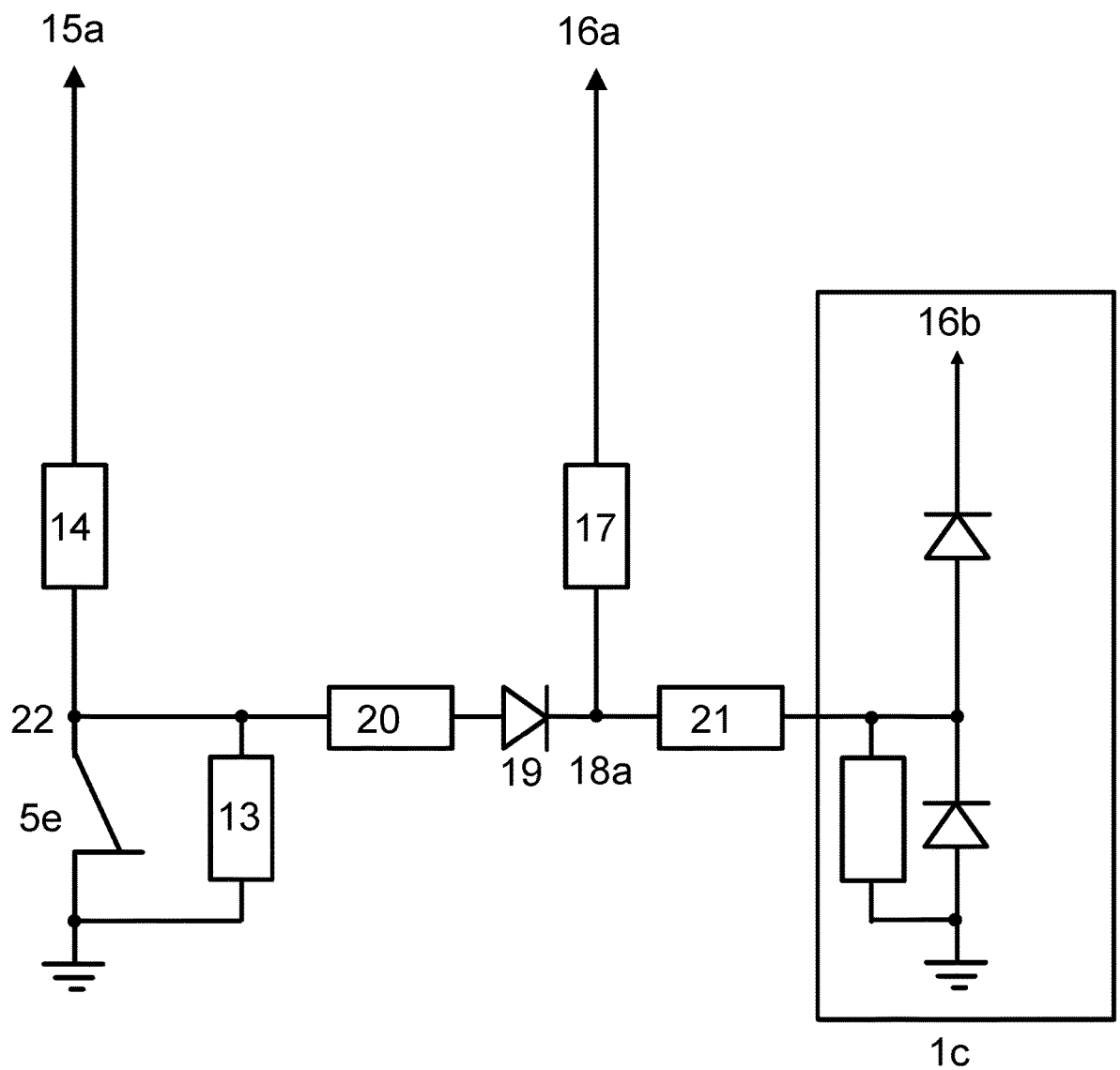
FIG. 4 shows a circuit for testing the integrity of a relay.

FIG. 4 shows a suitable circuit for testing a break contact 5e. The break contact 5e may be the relay 5d in FIG. 3, for instance. A resistor 13 of value 10 Megaohms, for instance, is connected in parallel with the relay 5e. A load 14, for instance the valve 4 in FIG. 1, is connected in series with the relay 5e. The load 14 lies at a first supply voltage 15a. In some embodiments, the first supply voltage 15a is a line voltage of 220 Volts to 240 Volts at 50 Hertz, or of approximately 110 Volts at 60 Hertz.

A second supply voltage 16a, 16b supplies the circuit in FIG. 4 at a DC voltage of typically 1.2 Volts and/or 2 Volts and/or 3 Volts and/or 3.3 Volts and/or 5 Volts and/or 6 Volts. A resistor 17, for instance of value 6.8 kiloohms, leads from a first supply point 16a to a node 18a of the circuit. A diode 19 and a resistor 20 limit the currents between the points at the first supply voltage 15a and at the second supply voltage 16a. In some embodiments, the diode 19 is a diode of type 1N4007, and the resistor 20 has a value of 150 kiloohms.

An additional resistor, for instance of value 47 kiloohms, leads from the node 18a towards an input of a processing unit 1c. The processing unit 1c may be, for example, one of the processing units 1a or 1b in FIG. 1. It is supplied by a supply voltage 16b. The supply voltage 16b for the processing unit 1c is typically equal to the supply voltage 16a.

If the relay 5e now receives a command to open and yet does not open because of welded contacts, the node 22 is taken to earth potential and/or ground potential. Consequently, the AC voltage based on the supply voltage 15a no longer influences the signal at the input of the processing unit 1c. Instead, the input of the processing unit 1c exhibits substantially the second supply voltage 16a. The processing unit 1c infers from the High signal at its input a fault in the relay 5e.

In the example given containing a resistor 13 of value 10 Megaohms, a contact resistance in the relay 5e of less than 10 Megaohms results in a fault being detected. If the resistor 13 assumes a value of 25 kiloohms, then a contact resistance in the relay 5e of less than 25 kiloohms results in a fault being detected. Other limits for fault detection can be set by changing the resistors 17, 20 and/or 21, and/or by changes at the input of the processing unit 1c.

The AC voltage component at the input of the processing unit 1c can be increased by an additional branch between an additional supply voltage 15b and an additional node 18b. Moreover, dependencies on the load 14 can be reduced by the additional branch between the additional supply voltage 15b and the additional node 18b.

Figure 5:
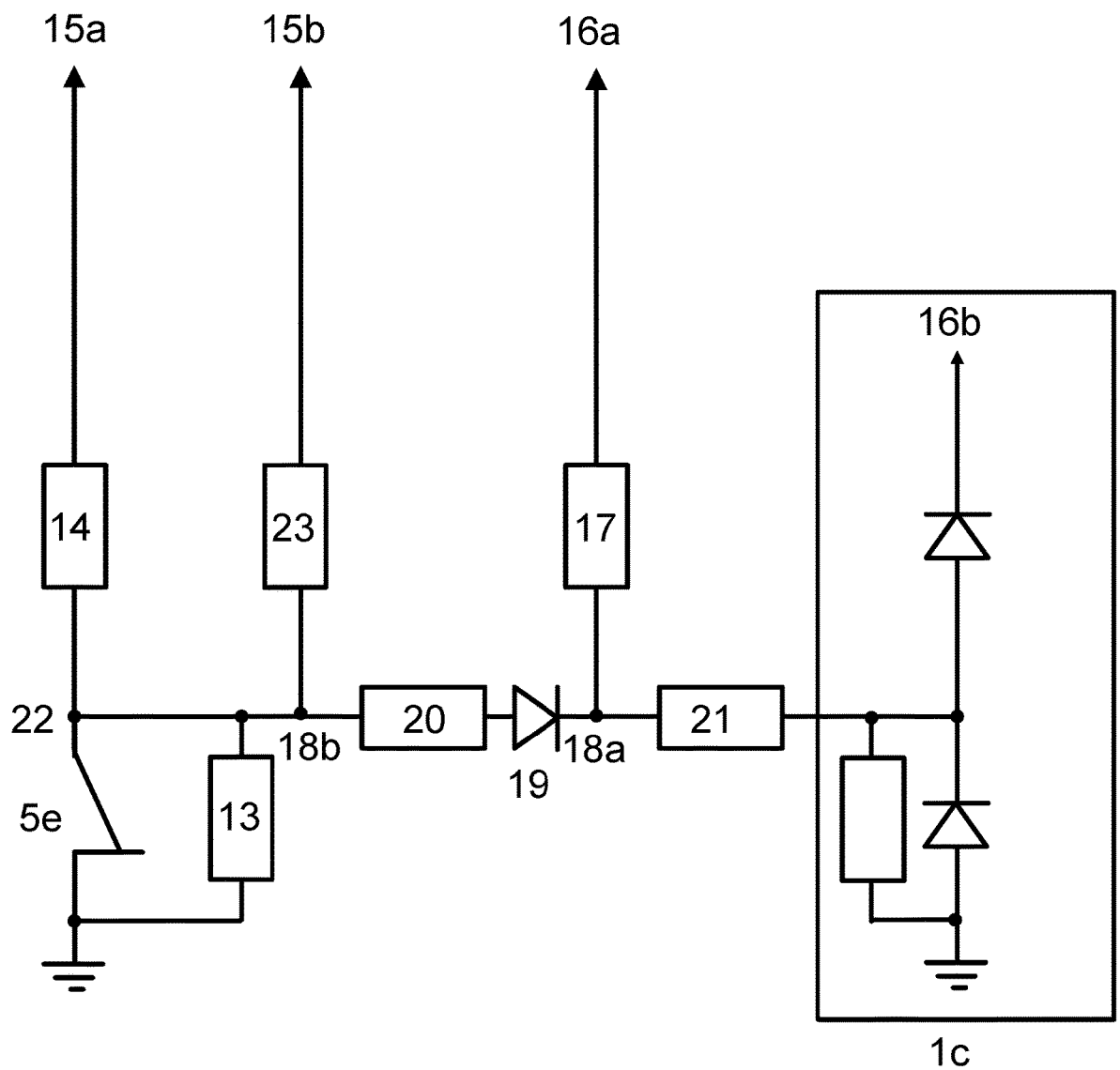
FIG. 5 shows a further circuit for testing the integrity of a relay.

FIG. 5 shows a corresponding circuit. The additional supply voltage 15b is ideally equal to the supply voltage 15a. The resistor 23 typically has a value of 200 kiloohms.

In some embodiments, there is a switching arrangement comprising: a first and a second processing unit (1a, 1b) each comprising a first input,
an OR gate (7), a first position feedback device (6a) and a first switch (5a), wherein the OR gate (7) has an output and is in operative communication with the first switch (5a) via the output of the OR gate (7),
wherein the OR gate (7) has a first input and a second input, and the first processing unit (1a) is in operative communication with the OR gate (7) via the first input of the OR gate (7), and the second processing unit (1b) is in operative communication with the OR gate (7) via the second input of the OR gate (7),
wherein at least one of the processing units (1a, 1b) is configured to send a digital ON signal to the OR gate (7), and the OR gate (7) is configured to actuate the first switch (5a) on receiving the digital ON signal,
wherein the first position feedback device (6a) is associated with the first switch (5a) and is in operative communication with the first input of the first processing unit (1a) and with the first input of the second processing unit (1b),
wherein the processing units (1a, 1b) are communicatively interconnected, and each of the processing units (1a, 1b) is configured to:

read a first position signal from the first position feedback device (6a);
send the read first position signal to the other processing unit (1b, 1a) so that the other processing unit (1b, 1a) receives the sent first position signal;
compare the read first position signal with the received first position signal; and
output an error message if the read first position signal is different from the received first position signal.

In some embodiments, each of the processing units (1a, 1b) is in operative communication with the adjustable current and/or voltage supply (9), and configured to send a deactivation signal to the adjustable current and/or voltage supply (9) if the read first position signal is different from the received first position signal.

In some embodiments, the first the processing unit (1a) is connected to the first AND gate (8a), and is configured to send a deactivation signal to the first AND gate (8a) if the read first position signal is different from the received first position signal. In some embodiments, the second processing unit (1b) is connected to the second AND gate (8b), and is configured to send a deactivation signal to the second AND gate (8b) if the read first position signal is different from the received first position signal.

The first processing unit (1a) comprises a first input. The second processing unit (1b) comprises a first input.

The switching arrangement may be a switching arrangement for an automatic burner control unit. In some embodiments, the switching arrangement is a switching arrangement of an automatic burner control unit. In some embodiments, the switching arrangement is a circuit arrangement.

In some embodiments, the OR gate (7) and/or the output of the OR gate (7) is communicatively and unidirectionally connected to the first switch (5a). The OR gate (7) sends signals to the first switch (5a) via the output of the OR gate (7). The first switch (5a) receives signals from the output of the OR gate (7). The first switch (5a) does not send any signals to the OR gate (7). The first switch (5a) does not send any signals to the output of the OR gate (7). The OR gate (7) and/or the output of the OR gate (7) does not receive any signals from the first switch (5a). Unidirectional connections reduce the complexity of the switching arrangement.

In some embodiments, the first processing unit (1a) is communicatively and unidirectionally connected to the first input of the OR gate (7). The first processing unit (1a) sends signals to the first input of the OR gate (7). The first input of the OR gate (7) receives signals from the first processing unit (1a). The OR gate (7) and/or the first input of the OR gate (7) does not send any signals to the first processing unit (1a). The first processing unit (1a) does not receive any signals from the OR gate (7) and/or from the first input of the OR gate (7).

In some embodiments, the second processing unit (1b) is communicatively and unidirectionally connected to the second input of the OR gate (7). The second processing unit (1b) sends signals to the second input of the OR gate (7). The second input of the OR gate (7) receives signals from the second processing unit (1b). The OR gate (7) and/or the second input of the OR gate (7) does not send any signals to the second processing unit (1b). The second processing unit (1b) does not receive any signals from the OR gate (7) and/or from the second input of the OR gate (7).

In some embodiments, the digital ON signal is a signal having a voltage between 2.4 Volts and 6 Volts. In some embodiments, the digital ON signal is a signal having a voltage between 4.5 Volts and 5.5 Volts. In some embodiments, the digital ON signal is a signal having a voltage of 5 Volts.

In some embodiments, the OR gate (7) is configured to generate and send to the first switch (5a) a switching signal on receiving the digital ON signal from at least one of the processing units (1a, 1b). On receiving the switching signal, the first switch (5a) performs a switching operation. In some embodiments, the first switch (5a) is a break contact. The first switch (5a) is thus designed to open on receiving the switching signal. In some embodiments, the switching signal is a signal having a voltage between 5 Volts and 30 Volts. In some embodiments, the switching signal is a signal having a voltage between 4.5 Volts and 5.5 Volts. In some embodiments, the switching signal is a signal having a voltage of 5 Volts. In another specific embodiment, the switching signal is a signal having a voltage of 6 Volts and/or 12 Volts and/or 24 Volts.

In some embodiments, the first position feedback device (6a) is communicatively and unidirectionally connected to the first input of the first processing unit (1a) and to the first input of the second processing unit (1b). The first position feedback device (6a) sends a first position signal to the first processing unit (1a) via the first input of the first processing unit (1a) and to the second processing unit (1b) via the first input of the second processing unit (1b). The first processing unit (1a) does not send via the first input of the first processing unit (1a) a signal or a first position signal to the first position feedback device (6a). The second processing unit (1b) does not send via the first input of the second processing unit (1b) a signal or a first position signal to the first position feedback device (6a).

In some embodiments, the first and the second processing units (1a, 1b) are communicatively and bidirectionally interconnected. The switching arrangement ideally comprises a bidirectional bus (2). The first processing unit (1a) is connected, in particular communicatively connected, to the bidirectional bus (2). The second processing unit (1b) is likewise connected, in particular communicatively connected, to the bidirectional bus (2).

In some embodiments, each of the processing units (1a, 1b) is configured to output an error message by outputting a visual and/or audible signal if the read first position signal is different from the received first position signal. In some embodiments, each of the processing units (1a, 1b) comprises an error register, and is configured to output an error message by setting a value in the associated error register if the read first position signal is different from the received first position signal. In some embodiments, each of the processing units (1a, 1b) comprises an interface to a higher-level monitoring apparatus, and is configured to output an error message by sending an error signal to the higher-level monitoring apparatus by means of the associated interface if the read first position signal is different from the received first position signal.

In some embodiments, the switching arrangement comprises a valve (4). The first switch (5a) and the valve (4) are connected in series.

In some embodiments, each of the processing units (1a, 1b) is configured to send a digital ON signal to the OR gate (7), wherein the OR gate (7) is configured to actuate the first switch (5a) on receiving at least one digital ON signal, wherein each of the processing units (1a, 1b) is configured to: read a first position signal from the first position feedback device (6a) after sending the digital ON signal; send the read first position signal to the other processing unit (1b, 1a) so that the other processing unit (1b, 1a) receives the sent first position signal; compare the read first position signal with the received first position signal; and output an error message if the read first position signal is different from the received first position signal.

In some embodiments, each of the processing units (1a, 1b) is configured to read a first position signal from the first position feedback device (6a) at most 5 seconds after sending the digital ON signal. In some embodiments, each of the processing units (1a, 1b) is configured to read a first position signal from the first position feedback device (6a) at most 3 seconds after sending the digital ON signal. In some embodiments, each of the processing units (1a, 1b) is configured to read a first position signal from the first position feedback device (6a) at most 1 second after sending the digital ON signal. Faulty switches (5a-5d) and/or faulty processing units (1a, 1b) are made known promptly by reading the first position signal quickly.

In some embodiments, the processing units (1a, 1b) are communicatively interconnected, and the first processing unit (1a) is configured to send a digital ON signal to the OR gate (7), and in consequence of sending the digital ON signal to the OR gate (7), to send a notification signal to the second processing unit (1b), wherein each of the processing units (1a, 1b) is configured to: read a first position signal from the first position feedback device (6a) after sending the digital ON signal;
send the read first position signal to the other processing unit (1b, 1a) so that the other processing unit (1b, 1a) receives the sent first position signal; compare the read first position signal with the received first position signal; and output an error message if the read first position signal is different from the received first position signal.

In some embodiments, the first processing unit (1a) is configured to send a notification signal to the second processing unit (1b) at most 10 microseconds after sending the digital ON signal. In some embodiments, the first processing unit (1a) is configured to send a notification signal to the second processing unit (1b) at most 5 seconds after sending the digital ON signal. In some embodiments, the first processing unit (1a) is configured to send a notification signal to the second processing unit (1b) at most 3 seconds after sending the digital ON signal. In some embodiments, the first processing unit (1a) is configured to send a notification signal to the second processing unit (1b) at most 1 second after sending the digital ON signal. Prompt transmission of the notification signal reduces synchronization problems and/or coordination problems between the processing units (1a, 1b).

In some embodiments, the switching arrangement additionally comprises a current and/or voltage supply (3), wherein the first processing unit (1a) comprises an error register and a supply input, wherein the current and/or voltage supply (3) is galvanically connected to the supply input of the first processing unit (1a), wherein the first processing unit (1a) comprises a unit for monitoring over time a supply signal at the supply input of the first processing unit (1a), and wherein the unit for monitoring over time the supply signal is configured to set a value in the error register if the supply signal falls below a specified value.

In some embodiments, the error register is an error register of the unit for monitoring over time the supply signal. In some embodiments, the unit for monitoring over time the supply signal comprises a unit for brownout detection and/or a unit for voltage-drop detection. It is also provided that the unit for monitoring over time the supply signal is a unit for brownout detection and/or a unit for voltage-drop detection.

In some embodiments, the switching arrangement additionally comprises a current and/or voltage supply (3), wherein each of the processing units (1a, 1b) comprises an error register and a supply input, wherein the current and/or voltage supply (3) is galvanically connected to each of the supply inputs of the processing units (1a, 1b), wherein the first processing unit (1a) comprises a first unit for monitoring over time a supply signal at the supply input of the first processing unit (1a), wherein the first unit for monitoring over time the supply signal is configured to set a value in the error register of the first processing unit (1a) if the supply signal at the supply input of the first processing unit (1a) falls below a specified value, wherein the second processing unit (1b) comprises a second unit for monitoring over time a supply signal at the supply input of the second processing unit (1b), and wherein the second unit for monitoring over time the supply signal is configured to set a value in the error register of the second processing unit (1b) if the supply signal at the supply input of the second processing unit (1b) falls below a specified value.

In some embodiments, the first processing unit (1a) additionally comprises a second input, and the second processing unit (1b) additionally comprises a second input, wherein the switching arrangement additionally comprises a first AND gate (8a), a second position feedback device (6b) and a second switch (5b), wherein the first AND gate (8a) has an output and is in operative communication with the second switch (5b) via the output of the first AND gate (8a), wherein the first AND gate (8a) has a first input and a second input, and the first processing unit (1a) is in operative communication with the first AND gate (8a) via the first input of the first AND gate (8a), and the second processing unit (1b) is in operative communication with the first AND gate (8a) via the second input of the first AND gate (8a), wherein each of the processing units (1a, 1b) is configured to send a digital ON signal to the first AND gate (8a), and the first AND gate (8a) is configured to actuate the second switch (5b) solely on receiving both digital ON signals, wherein the second position feedback device (6b) is associated with the second switch (5b) and is in operative communication with the second input of the first processing unit (1a) and with the second input of the second processing unit (1b), wherein the processing units (1a, 1b) are communicatively interconnected, and each of the processing units (1a, 1b) is configured to: read a second position signal from the second position feedback device (6b); send the read second position signal to the other processing unit (1b, 1a) so that the other processing unit (1b, 1a) receives the sent second position signal; compare the read second position signal with the received second position signal; and output an error message if the read second position signal is different from the received second position signal.

The first switch (5a) is different from the second switch (5b). The first position feedback device (6a) is different from the second position feedback device (6b).

In some embodiments, the first AND gate (8a) and/or the output of the first AND gate (8a) is communicatively and unidirectionally connected to the second switch (5b). The first AND gate (8a) sends signals to the second switch (5b) via the output of the first AND gate (8a). The second switch (5b) receives signals from the output of the first AND gate (8a). The second switch (5b) does not send any signals to the first AND gate (8a). The second switch (5b) does not send any signals to the output of the first AND gate (8a). The first AND gate (8a) and/or the output of the first AND gate (8a) does not receive any signals from the second switch (5b).

In some embodiments, the first processing unit (1a) is communicatively and unidirectionally connected to the second input of the first AND gate (8a). The first processing unit (1a) sends signals to the first input of the first AND gate (8a). The first input of the first AND gate (8a) receives signals from the first processing unit (1a). The first AND gate (8a) and/or the first input of the first AND gate (8a) does not send any signals to the first processing unit (1a). The first processing unit (1a) does not receive any signals from the first AND gate (8a) and/or from the first input of the first AND gate (8a).

In some embodiments, the second processing unit (1b) is communicatively and unidirectionally connected to the second input of the first AND gate (8a). The second processing unit (1b) sends signals to the second input of the first AND gate (8a). The second input of the first AND gate (8a) receives signals from the second processing unit (1b). The first AND gate (8a) and/or the second input of the first AND gate (8a) does not send any signals to the second processing unit (1b). The second processing unit (1b) does not receive any signals from the first AND gate (8a) and/or from the second input of the first AND gate (8a).

In some embodiments, the first AND gate (8a) is configured to generate and send to the second switch (5b) a switching signal solely on receiving the digital ON signals from both processing units (1a, 1b). On receiving the switching signal, the second switch (5b) performs a switching operation. In some embodiments, the second switch (5b) is a make contact. The second switch (5b) is thus designed to close on receiving the switching signal. It is provided that the switching signal is a signal having a voltage between 5 Volts and 30 Volts. In some embodiments, the switching signal is a signal having a voltage between 4.5 Volts and 5.5 Volts. In some embodiments, the switching signal is a signal having a voltage of 5 Volts. In some embodiments, the switching signal is a signal having a voltage of 6 Volts and/or 12 Volts and/or 24 Volts.

In some embodiments, the second position feedback device (6b) is communicatively and unidirectionally connected to the second input of the first processing unit (1a) and to the second input of the second processing unit (1b). The second position feedback device (6b) sends a second position signal to the first processing unit (1a) via the second input of the first processing unit (1a) and to the second processing unit (1b) via the second input of the second processing unit (1b). The first processing unit (1a) does not send via the second input of the first processing unit (1a) a signal or a second position signal to the second position feedback device (6b). The second processing unit (1b) does not send via the second input of the second processing unit (1b) a signal or a second position signal to the second position feedback device (6b).

In some embodiments, each of the processing units (1a, 1b) is configured to output an error message by outputting a visual and/or audible signal if the read second position signal is different from the received second position signal. In some embodiments, each of the processing units (1a, 1b) comprises an error register, and is configured to output an error message by setting a value in the associated error register if the read second position signal is different from the received second position signal. In some embodiments, each of the processing units (1a, 1b) comprises an interface to a higher-level monitoring apparatus, and is configured to output an error message by sending an error signal to the higher-level monitoring apparatus by means of the associated interface if the read second position signal is different from the received second position signal.

In some embodiments, the switching arrangement comprises a valve (4). The second switch (5b) and the valve (4) are connected in series. In some embodiments, the first switch (5a), the second switch (5b) and the valve (4) are connected in series.

In some embodiments, the switching arrangement comprises an adjustable current and/or voltage supply (9), wherein the adjustable current and/or voltage supply (9) comprises an output and an enable input, and the first processing unit (1a) comprises an enable output, wherein the first processing unit (1a) is in operative communication with the adjustable current and/or voltage supply (9) via the enable output of the first processing unit (1a) and via the enable input of the adjustable current and/or voltage supply (9), wherein the first processing unit (1a) is configured to send an enable signal to the adjustable current and/or voltage supply (9), and wherein the adjustable current and/or voltage supply (9) is configured to provide a digital ON signal at its output in response to receiving the enable signal.

In some embodiments, the switching arrangement comprises an adjustable current and/or voltage supply (9), wherein the adjustable current and/or voltage supply (9) comprises an output and an enable input, and the second processing unit (1b) comprises an enable output, wherein the second processing unit (1b) is in operative communication with the adjustable current and/or voltage supply (9) via the enable output of the second processing unit (1b) and via the enable input of the adjustable current and/or voltage supply (9), wherein the second processing unit (1b) is configured to send an enable signal to the adjustable current and/or voltage supply (9), and wherein the adjustable current and/or voltage supply (9) is configured to provide a digital ON signal at its output in response to receiving the enable signal.

In some embodiments, the enable signal is an oscillating signal, in particular a square wave signal oscillating at a frequency of at least 20 Hertz and/or 1 kilohertz and/or 5 kilohertz, at least 10 kilohertz, or at least 20 kilohertz.

In some embodiments, the switching arrangement comprises an AND gate (8a) and an adjustable current and/or voltage supply (9), wherein the first AND gate (8a) comprises a third input, wherein the output of the adjustable current and/or voltage supply (9) is galvanically connected to the third input of the first AND gate (8a), wherein the first AND gate (8a) is configured to actuate the second switch (5b) if, and only if, a digital ON signal is present at the first input of the first AND gate (8a), and a digital ON signal is present at the second input of the first AND gate (8a), and a digital ON signal is present at the third input of the first AND gate (8a).

If any of the conditions specifying a digital ON signal is present at the first input of the first AND gate (8a), and a digital ON signal is present at the second input of the first AND gate (8a), and a digital ON signal is present at the third input of the first AND gate (8a) is not satisfied, the second switch (5b) is not actuated.

In some embodiments, the first processing unit (1a) additionally comprises a third input, and the second processing unit (1b) additionally comprises a third input, wherein the switching arrangement additionally comprises a second AND gate (8b), a third position feedback device (6c) and a third switch (5c), wherein the second AND gate (8b) has an output and is in operative communication with the third switch (5c) via the output of the second AND gate (8b), wherein the second AND gate (8b) has a first input and a second input, and the first processing unit (1a) is in operative communication with the second AND gate (8b) via the first input of the second AND gate (8b), and the second processing unit (1b) is in operative communication with the second AND gate (8b) via the second input of the second AND gate (8b), wherein each of the processing units (1a, 1b) is configured to send a digital ON signal to the second AND gate (8b), and the second AND gate (8b) is configured to actuate the third switch (5c) solely on receiving both digital ON signals, wherein the third position feedback device (6c) is associated with the third switch (5c) and is in operative communication with the third input of the first processing unit (1a) and with the third input of the second processing unit (1b), wherein the processing units (1a, 1b) are communicatively interconnected, and each of the processing units (1a, 1b) is configured to: read a third position signal from the third position feedback device (6c); send the read third position signal to the other processing unit (1b, 1a) so that the other processing unit (1b, 1a) receives the sent third position signal; compare the read third position signal with the received third position signal; and output an error message if the read third position signal is different from the received third position signal.

The first switch (5a) is different from the third switch (5c). The second switch (5b) is different from the third switch (5c). The first position feedback device (6a) is different from the third position feedback device (6c). The second position feedback device (6b) is different from the third position feedback device (6c).

In some embodiments, the second AND gate (8b) and/or the output of the second AND gate (8b) is communicatively and unidirectionally connected to the third switch (5c). The second AND gate (8b) sends signals to the third switch (5c) via the output of the second AND gate (8b). The third switch (5c) receives signals from the output of the second AND gate (8b). The third switch (5c) does not send any signals to the second AND gate (8b). The third switch (5c) does not send any signals to the output of the second AND gate (8b). The second AND gate (8b) and/or the output of the second AND gate (8b) does not receive any signals from the third switch (5c).

In some embodiments, the first processing unit (1a) is communicatively and unidirectionally connected to the second input of the second AND gate (8b). The first processing unit (1a) sends signals to the first input of the second AND gate (8b). The first input of the second AND gate (8b) receives signals from the first processing unit (1a). The second AND gate (8b) and/or the first input of the second AND gate (8b) does not send any signals to the first processing unit (1a). The first processing unit (1a) does not receive any signals from the second AND gate (8b) and/or from the first input of the second AND gate (8b).

In some embodiments, the second processing unit (1b) is communicatively and unidirectionally connected to the second input of the second AND gate (8b). The second processing unit (1b) sends signals to the second input of the second AND gate (8b). The second input of the second AND gate (8b) receives signals from the second processing unit (1b). The second AND gate (8b) and/or the second input of the second AND gate (8b) does not send any signals to the second processing unit (1b). The second processing unit (1b) does not receive any signals from the second AND gate (8b) and/or from the second input of the second AND gate (8b).

In some embodiments, the second AND gate (8b) is configured to generate and send to the third switch (5c) a switching signal solely on receiving the digital ON signals from both processing units (1a, 1b). On receiving the switching signal, the third switch (5c) performs a switching operation. In some embodiments, the third switch (5c) is a make contact. The third switch (5c) is thus designed to close on receiving the switching signal. In some embodiments, the switching signal is a signal having a voltage between 2.4 Volts and 6 Volts. In some embodiments, the switching signal is a signal having a voltage between 4.5 Volts and 5.5 Volts. In some embodiments, the switching signal is a signal having a voltage of 5 Volts.

In some embodiments, the third position feedback device (6c) is communicatively and unidirectionally connected to the third input of the first processing unit (1a) and to the third input of the second processing unit (1b). The third position feedback device (6c) sends a third position signal to the first processing unit (1a) via the third input of the first processing unit (1a) and to the second processing unit (1b) via the third input of the second processing unit (1b). The first processing unit (1a) does not send via the third input of the first processing unit (1a) a signal or a third position signal to the third position feedback device (6c). The second processing unit (1b) does not send via the third input of the second processing unit (1b) a signal or a third position signal to the third position feedback device (6c).

In some embodiments, each of the processing units (1a, 1b) is configured to output an error message by outputting a visual and/or audible signal if the read third position signal is different from the received third position signal. In some embodiments, each of the processing units (1a, 1b) comprises an error register, and is configured to output an error message by setting a value in the associated error register if the read third position signal is different from the received third position signal. In some embodiments, each of the processing units (1a, 1b) comprises an interface to a higher-level monitoring apparatus, and is configured to output an error message by sending an error signal to the higher-level monitoring apparatus by means of the associated interface if the read third position signal is different from the received third position signal.

In some embodiments, the switching arrangement comprises a valve (4). The third switch (5c) and the valve (4) are connected in series. The first switch (5a), the second switch (5b), the third switch (5c) and the valve (4) may be connected in series. In some embodiments, the first switch (5a), the second switch (5b), the third switch (5c) and the valve (4) are connected in series in this order.

In some embodiments, there is a second AND gate (8b) and comprising an adjustable current and/or voltage supply (9), wherein the second AND gate (8b) comprises a third input, wherein the output of the adjustable current and/or voltage supply (9) is galvanically connected to the third input of the second AND gate (8b), wherein the second AND gate (8b) is configured to actuate the third switch (5c) if, and only if, a digital ON signal is present at the first input of the second AND gate (8b), and a digital ON signal is present at the second input of the second AND gate (8b), and a digital ON signal is present at the third input of the second AND gate (8b).

If any of the conditions specifying a digital ON signal is present at the first input of the second AND gate (8b), and a digital ON signal is present at the second input of the second AND gate (8b), and a digital ON signal is present at the third input of the second AND gate (8b) is not satisfied, the third switch (5c) is not actuated.

In some embodiments, the switching arrangement additionally comprises: a fourth position feedback device (6d) and a fourth switch (5d), wherein the fourth switch (5d) is mechanically coupled to the first switch (5a) so that the fourth switch (5d) is in an open position if, and only if, the first switch (5a) is in an open position, and the fourth switch (5d) is in a closed position if, and only if, the first switch (5a) is in a closed position, wherein the fourth position feedback device (6d) is associated with the fourth switch (5d) and is in operative communication with the third input of the first processing unit (1a) and to the third input of the second processing unit (1b), wherein the processing units (1a, 1b) are communicatively interconnected, and each of the processing units (1a, 1b) is configured to: read a fourth position signal from the fourth position feedback device (6d); send the read fourth position signal to the other processing unit (1b, 1a) so that the other processing unit (1b, 1a) receives the sent fourth position signal; compare the read fourth position signal with the received fourth position signal; and output an error message if the read fourth position signal is different from the received fourth position signal.

In some embodiments, the first switch (5a) has an open position and a closed position. The fourth switch (5d) likewise has an open position and a closed position. In some embodiments, the fourth switch (5d) is mechanically coupled directly to the first switch (5a) so that the fourth switch (5d) is in an open position if, and only if, the first switch (5a) is in an open position, and the fourth switch (5d) is in a closed position if, and only if, the first switch (5a) is in a closed position.

The first switch (5a) is different from the fourth switch (5d). The second switch (5b) is different from the fourth switch (5d). The third switch (5c) is different from the fourth switch (5d). The first position feedback device (6a) is different from the fourth position feedback device (6d). The second position feedback device (6b) is different from the fourth position feedback device (6d). The third position feedback device (6c) is different from the fourth position feedback device (6d).

In some embodiments, the fourth position feedback device (6d) is communicatively and unidirectionally connected to the third input of the first processing unit (1a) and to the third input of the second processing unit (1b). The fourth position feedback device (6d) sends a fourth position signal to the first processing unit (1a) via the third input of the first processing unit (1a) and to the second processing unit (1b) via the third input of the second processing unit (1b). The first processing unit (1a) does not send via the third input of the first processing unit (1a) a signal or a fourth position signal to the fourth position feedback device (6d). The second processing unit (1b) does not send via the third input of the second processing unit (1b) a signal or a fourth position signal to the fourth position feedback device (6d).

In some embodiments, each of the processing units (1a, 1b) is configured to output an error message by outputting a visual and/or audible signal if the read fourth position signal is different from the received fourth position signal. In some embodiments, each of the processing units (1a, 1b) comprises an error register, and is configured to output an error message by setting a value in the associated error register if the read fourth position signal is different from the received fourth position signal. It is also provided that each of the processing units (1a, 1b) comprises an interface to a higher-level monitoring apparatus and is configured to output an error message by sending an error signal to the higher-level monitoring apparatus by means of the associated interface if the read fourth position signal is different from the received fourth position signal.

In some embodiments, the switching arrangement comprises a valve (4). The fourth switch (5d) and the valve (4)

are connected in series. In some embodiments, the first switch (5*a*), the second switch (5*b*), the third switch (5*c*), the valve (4) and the fourth switch (5*d*) are connected in series. In some embodiments, the first switch (5*a*), the second switch (5*b*), the third switch (5*c*), the valve (4) and the fourth switch (5*d*) are connected in series in this order.

In some embodiments, there is a fourth position feedback device (6*d*), wherein each of the processing units (1*a*, 1*b*) is configured to: compare the read first position signal with the received fourth position signal; and output an error message if the read first position signal is different from the received fourth position signal.

In some embodiments, each of the processing units (1*a*, 1*b*) is configured to output an error message by outputting a visual and/or audible signal if the read first position signal is different from the received fourth position signal. In some embodiments, each of the processing units (1*a*, 1*b*) comprises an error register, and is configured to output an error message by setting a value in the associated error register if the read first position signal is different from the received fourth position signal. In some embodiments, each of the processing units (1*a*, 1*b*) comprises an interface to a higher-level monitoring apparatus, and is configured to output an error message by sending an error signal to the higher-level monitoring apparatus by means of the associated interface if the read first position signal is different from the received fourth position signal.

In some embodiments, there is a fourth position feedback device (6*d*), wherein each of the processing units (1*a*, 1*b*) is configured to: compare the read fourth position signal with the received first position signal; and output an error message if the read fourth position signal is different from the received first position signal.

In some embodiments, each of the processing units (1*a*, 1*b*) is configured to output an error message by outputting a visual and/or audible signal if the read fourth position signal is different from the received first position signal. In some embodiments, each of the processing units (1*a*, 1*b*) comprises an error register, and is configured to output an error message by setting a value in the associated error register if the read fourth position signal is different from the received first position signal. In some embodiments, each of the processing units (1*a*, 1*b*) comprises an interface to a higher-level monitoring apparatus, and is configured to output an error message by sending an error signal to the higher-level monitoring apparatus by means of the associated interface if the read fourth position signal is different from the received first position signal.

In some embodiments, there is a fourth switch (5*d*), wherein the switching arrangement additionally comprises a valve (4), wherein the first switch (5*a*), the valve (4) and the fourth switch (5*d*) are connected in series, and wherein the valve (4) is arranged between the first switch (5*a*) and the fourth switch (5*d*).

In some embodiments, the valve (4) is arranged in terms of circuitry between the first switch (5*a*) and the fourth switch (5*d*). The valve (4) may be connected in series between the first switch (5*a*) and the fourth switch (5*d*).

In some embodiments, the valve (4) is arranged in terms of circuitry between the second switch (5*b*) and the fourth switch (5*d*). The valve (4) may be connected in series between the second switch (5*b*) and the fourth switch (5*d*).

In some embodiments, there is a fourth switch (5*d*), wherein the switching arrangement additionally comprises a valve (4), wherein the third switch (5*c*), the valve (4) and the fourth switch (5*d*) are connected in series, and wherein the valve (4) is arranged between the third switch (5*c*) and the fourth switch (5*d*).

In some embodiments, the valve (4) is arranged in terms of circuitry between the third switch (5*c*) and the fourth switch (5*d*). The valve (4) may be connected in series between the third switch (5*c*) and the fourth switch (5*d*).

In some embodiments, there is a fourth position feedback device (6*d*), wherein the switching arrangement comprises at least one feedback resistor (12), and wherein the fourth position feedback device (6*d*) is galvanically connected to the at least one feedback resistor (12).

In some embodiments, the first switch (5*a*) comprises a contact. The at least one feedback resistor (12) is galvanically connected to the contact of the first switch. In some embodiments, the switching arrangement comprises a current and/or voltage supply (10) for the valve. In this case, the contact of the first switch (5*a*) and the at least one feedback resistor (12) are both galvanically connected to the valve current and/or voltage supply (10).

In some embodiments, there is a fourth position feedback device (6*d*), wherein the switching arrangement comprises at least one parallel resistor (13) and at least one diode (19), wherein the at least one parallel resistor (13) is connected in parallel with the fourth switch (5*d*, 5*e*), wherein the at least one parallel resistor (13) comprises a first contact, and the fourth switch (5*d*, 5*e*) comprises a first contact, wherein the first contact of the at least one parallel resistor (13) is galvanically connected to the first contact of the fourth switch (5*d*, 5*e*), wherein the first contact is connected via the at least one diode (19) to the third input of the first processing unit (1*a*).

In some embodiments, the at least one parallel resistor (13) comprises a second contact, and the fourth switch (5*d*, 5*e*) comprises a second contact. Said second contact of the at least one parallel resistor (13) is galvanically connected to said second contact of the fourth switch (5*d*, 5*e*). In some embodiments, the switching arrangement comprises a ground and/or a ground terminal (11). The second contact of the at least one parallel resistor (13) is galvanically connected to ground and/or to the ground terminal (11).

The description above relates to example embodiments of the disclosure. The embodiments can be modified in various ways without departing from either the fundamental idea or the scope of this disclosure. The subject matter of the present disclosure is not limited by these examples. The most varied of modifications can be made without departing from the scope of protection of the following claims.

LIST OF REFERENCE SIGNS

1*a*-1*c* processing units
2 communications bus
3 current and/or voltage supply
4 valve
5*a*-5*e* switches
6*a*-6*d* position feedback devices
7 OR gate
8*a*, 8*b* AND gates
9 adjustable current and/or voltage supply
10 valve current and/or voltage supply
11 ground and/or ground terminal
12 feedback resistor
13 parallel resistor
14 load
15*a*, 15*b* supply voltages
16*a*, 16*b* supply voltages
17 resistor 18a, 18b nodes
19 diode
20, 21 resistors
22 node
23 resistor

The invention claimed is:

1. A switching arrangement comprising:
a first processor and a second processor each comprising a first input;
an OR gate with an output, a first input, and a second input;
a first position feedback device; and
a first switch;
wherein the OR gate is in operative communication with the first switch via the output of the OR gate;
wherein the first processor is in operative communication with the OR gate via the first input of the OR gate and the second processor is in operative communication with the OR gate via the second input of the OR gate;
wherein at least one of the processor is programmed to send a digital ON signal to the OR gate and the OR gate is configured to actuate the first switch on receiving the digital ON signal;
wherein the first position feedback device is associated with the first switch and is in operative communication with the first input of the first processor and with the first input of the second processor;
wherein the first processor and the second processor are communicatively interconnected and each programmed to:
read a first position signal from the first position feedback device;
send the first position signal to the other processor;
compare the first position signal read by the respective processor to the first position signal received from the other processor; and
generate an error message if the first position signal read is different from the first position signal received.

2. The switching arrangement as claimed in claim 1, wherein:
each processor is further programmed to send a respective digital ON signal to the OR gate;
the OR gate is configured to actuate the first switch (5a) on receiving any digital ON signal.

3. The switching arrangement as claimed in claim 1, wherein the processor are communicatively interconnected; and
the first processor is further programmed to:
send a digital ON signal to the OR gate; and
send a notification signal to the second processor.

4. The switching arrangement as claimed in claim 1, further comprising a current and/or voltage supply;
wherein the first processor comprises an error register and a supply input;
the current and/or voltage supply is galvanically connected to the supply input of the first processor;
the first processor monitors over time a supply signal at the supply input of the first processor; and
the first processor sets a value in the error register if the supply signal falls below a specified value.

5. The switching arrangement as claimed in claim 1, wherein:
the first processor comprises a second input; and
the second processor comprises a second input;
the switching arrangement further comprises a first AND gate, a second position feedback device, and a second switch;
wherein the first AND gate has an output in operative communication with the second switch;
wherein the first AND gate has a first input and a second input and the first processor is in operative communication with the first AND gate via the first input of the first AND gate, and the second processor is in operative communication with the first AND gate via the second input of the first AND gate;
wherein each of the processors is further programmed to send a digital ON signal to the first AND gate and the first AND gate is configured to actuate the second switch solely on receiving both digital ON signals;
wherein the second position feedback device is associated with the second switch and is in operative communication with the second input of the first processor and with the second input of the second processor;
wherein the first processor and the second processor are communicatively interconnected and each programmed to:
read a second position signal from the second position feedback device;
send the read second position signal to the other processor;
compare the second position signal read with the second position signal received; and
generate an error message if the second position signal read is different from the second position signal received.

6. The switching arrangement as claimed in claim 5, wherein:
the first AND gate comprises a third input;
the output of the adjustable current and/or voltage supply is galvanically connected to the third input of the first AND gate;
the first AND gate is configured to actuate the second switch if, and only if, a digital ON signal is present at the first input of the first AND gate, and a digital ON signal is present at the second input of the first AND gate, and a digital ON signal is present at the third input of the first AND gate.

7. The switching arrangement as claimed in claim 1, further comprising an adjustable current and/or voltage supply with an output and an enable input;
wherein the first processor comprises an enable output in operative communication with the adjustable current and/or voltage supply via the enable input;
wherein the first processor is further programmed to send an enable signal to the adjustable current and/or voltage supply; and
wherein the adjustable current and/or voltage supply is configured to provide a digital ON signal at its output in response to receiving the enable signal.

8. The switching arrangement as claimed in claim 7, wherein:
the second AND gate comprises a third input;
the output of the adjustable current and/or voltage supply is galvanically connected to the third input of the second AND gate;
wherein the second AND gate is configured to actuate the third switch if, and only if, a digital ON signal is present at the first input of the second AND gate (8b), and a digital ON signal is present at the second input of the second AND gate (8b), and a digital ON signal is present at the third input of the second AND gate (8b).

9. The switching arrangement as claimed in claim 1, wherein:
the first processor comprises a third input; and
the second processor comprises a third input;
wherein the switching arrangement further comprises a second AND gate, a third position feedback device, and a third switch;
wherein the second AND gate has an output and is in operative communication with the third switch via the output of the second AND gate;
wherein the second AND gate has a first input and a second input;
the first processor is in operative communication with the second AND gate via the first input of the second AND gate;
wherein the second processing unit is in operative communication with the second AND gate via the second input of the second AND gate;
wherein each of the processors is configured to send a digital ON signal to the second AND gate;
the second AND gate is configured to actuate the third switch solely on receiving both digital ON signals;
the third position feedback device is associated with the third switch and is in operative communication with the third input of the first processing unit and with the third input of the second processing unit;
wherein the processors are communicatively interconnected, and each configured to:
read a third position signal from the third position feedback device;
send the read third position signal to the other processor;
compare the read third position signal with the received third position signal; and
generate an error message if the read third position signal is different from the received third position signal.

10. The switching arrangement as claimed in claim 1, further comprising:
a fourth position feedback device and a fourth switch mechanically coupled to the first switch so that the fourth switch is in an open position if, and only if, the first switch is in an open position, and the fourth switch is in a closed position if, and only if, the first switch is in a closed position;
wherein the fourth position feedback device is associated with the fourth switch and is in operative communication with the third input of the first processor and with the third input of the second processor;
wherein the processors are communicatively interconnected, and each of the processors is further programmed to:
read a fourth position signal from the fourth position feedback device;
send the read fourth position signal to the other processor;
compare the read fourth position signal with the received fourth position signal; and
generate an error message if the read fourth position signal is different from the received fourth position signal.

11. The switching arrangement as claimed in claim 10, wherein each of the processors is further programmed to:
compare the read first position signal with the received fourth position signal; and
generate an error message if the read first position signal is different from the received fourth position signal.

12. The switching arrangement as claimed in claim 10, wherein each of the processors is further programmed to:
compare the read fourth position signal with the received first position signal; and
generate an error message if the read fourth position signal is different from the received first position signal.

13. The switching arrangement as claimed in claim 10, further comprising a valve;
wherein the first switch, the valve, and the fourth switch are connected in series; and
wherein the valve is arranged between the first switch and the fourth switch.

14. The switching arrangement as claimed in claim 10, wherein:
the switching arrangement comprises at least one feedback resistor; and
the fourth position feedback device is galvanically connected to the at least one feedback resistor.

15. The switching arrangement as claimed in claim 10, further comprising at least one parallel resistor and at least one diode; wherein the at least one parallel resistor is connected in parallel with the fourth switch;
wherein a first contact of the at least one parallel resistor is galvanically connected to a first contact of the fourth switch; and
wherein the first contact is connected via the at least one diode to the third input of the first processing unit.

* * * * *